(12) United States Patent
Azaria et al.

(10) Patent No.: US 10,621,172 B2
(45) Date of Patent: Apr. 14, 2020

(54) SYSTEM AND METHOD FOR EFFICIENTLY GENERATING RESPONSES TO QUERIES

(71) Applicant: Sisense Ltd., Tel Aviv (IL)

(72) Inventors: Adi Azaria, Tel Aviv (IL); Amir Orad, New York, NY (US); Guy Levy Yurista, Rockville, MD (US); Guy Boyangu, Tel Aviv (IL); Eldad Farkash, Tel Aviv (IL); Ophir Marko, Netanya (IL)

(73) Assignee: Sisense Ltd., Ramat Gan (IL)

( * ) Notice: Subject to any disclaimer, the term of this patent is extended or adjusted under 35 U.S.C. 154(b) by 483 days.

(21) Appl. No.: 15/439,231

(22) Filed: Feb. 22, 2017

(65) Prior Publication Data

US 2018/0011911 A1 Jan. 11, 2018

Related U.S. Application Data

(60) Provisional application No. 62/360,429, filed on Jul. 10, 2016.

(51) Int. Cl.
*G06F 16/2455* (2019.01)
*G06F 16/2453* (2019.01)
*G06Q 10/06* (2012.01)

(52) U.S. Cl.
CPC .... *G06F 16/2455* (2019.01); *G06F 16/24539* (2019.01); *G06Q 10/06393* (2013.01)

(58) Field of Classification Search
CPC ........... G06F 16/2455; G06F 16/24539; G06F 16/26; G06F 16/58; G06F 16/248

USPC ........................................................ 707/722
See application file for complete search history.

(56) References Cited

U.S. PATENT DOCUMENTS

| 5,991,765 | A | 11/1999 | Vethe | |
|---|---|---|---|---|
| 8,615,404 | B2 | 12/2013 | Karkanias et al. | |
| 9,501,585 | B1 * | 11/2016 | Gautam | G06F 16/26 |
| 2004/0117358 | A1 * | 6/2004 | von Kaenel | G06Q 40/08 |
| 2011/0289010 | A1 * | 11/2011 | Rankin, Jr. | G06Q 10/10 |
| | | | | 705/313 |
| 2016/0124585 | A1 * | 5/2016 | Delacroix | G06F 16/248 |
| | | | | 715/739 |
| 2017/0091692 | A1 * | 3/2017 | Guo | G06F 16/58 |
| 2017/0242917 | A1 * | 8/2017 | Kenthapadi | G06Q 10/1053 |

\* cited by examiner

*Primary Examiner* — Dung K Chau
(74) *Attorney, Agent, or Firm* — M&B IP Analysts, LLC

(57) ABSTRACT

A system and method for efficiently responding to a query. The method comprises generating a lowest level data layer, wherein the lowest level data layer is a common dataset that can be served by a plurality of higher level data layers; generating, based on the lowest level data layer, at least one dataset, wherein each generated dataset is one of the plurality of higher level data layers, wherein each higher level data layer is accessed more rapidly than all lower level data layers; searching, in at least one of the generated data layers, for data needed to generate a response to the query; determining, based on the search, at least one data layer from which the response can be generated, wherein the determined at least one data layer includes the highest level data layer from which the response can be generated; and generating, based on data of the determined at least one data layer, a response to the query.

20 Claims, 7 Drawing Sheets

US 10,621,172 B2

SYSTEM AND METHOD FOR EFFICIENTLY GENERATING RESPONSES TO QUERIES

CROSS-REFERENCE TO RELATED APPLICATIONS

This application claims the benefit of U.S. Provisional Application No. 62/360,429 filed on Jul. 10, 2016, the contents of which are hereby incorporated by reference.

TECHNICAL FIELD

The present disclosure relates generally to business intelligence systems, and more particularly to faster processing of queries to business intelligence systems.

BACKGROUND

Data analytics systems are becoming an increasingly important part of a growing number of industries as the amount of raw data produced or otherwise retained in those industries increases. Many companies utilize analytics in an effort to obtain meaningful insights into the nature and consequences of raw data. Data analytics systems assist in determining these insights by processing the raw data and automatically providing output indicating information that may be readily interpreted by end users. The overwhelming amount of data to be analyzed in such industries often results in challenges in deriving meaningful analytics and, therefore, insights.

A particular set of techniques and tools utilized for data analytics may be employed by business intelligence (BI) systems. Such BI systems acquire and transform raw data (e.g., structured, unstructured, semi-structured data, or a combination thereof) into information that is meaningful and useful for analyzing a business. Insights generated by BI systems may be utilized for decision-making purposes related to, e.g., operations (e.g., product positioning or pricing), strategy (e.g., priorities or goals), and the like. Such decision-making use may be further enhanced by incorporating information from external systems (e.g., external systems providing data related to the industry) with internal data of the company.

Existing solutions for providing BI data allow for querying of BI systems. Such querying utilizes computing resources. The amount of computing resources required for providing the queried information increases as the amount of data accessible to a BI system increases. This is particularly true for larger enterprises, which typically collect and utilize significantly more data in BI systems. As a result, processing of queries may take longer as a business collects and retains more information.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for efficiently responding to a query. The method comprise generating a lowest level data layer, wherein the lowest level data layer is a common dataset that can be served by a plurality of higher level data layers; generating, based on the lowest level data layer, at least one dataset, wherein each generated dataset is one of the plurality of higher level data layers, wherein each higher level data layer is accessed more rapidly than all lower level data layers; searching, in at least one of the generated data layers, for data needed to generate a response to the query; determining, based on the search, at least one data layer from which the response can be generated, wherein the determined at least one data layer includes the highest level data layer from which the response can be generated; and generating, based on data of the determined at least one data layer, a response to the query.

Some embodiments disclosed herein also include a system for efficiently responding to a query. The system comprises a processing circuitry; and a memory, the memory containing instructions that, when executed by the processing circuitry, configure the system to: generate a lowest level data layer, wherein the lowest level data layer is a common dataset that can be served by a plurality of higher level data layers; generate, based on the lowest level data layer, at least one dataset, wherein each generated dataset is one of the plurality of higher level data layers, wherein each higher level data layer is accessed more rapidly than all lower level data layers; search, in at least one of the generated data layers, for data needed to generate a response to the query; determine, based on the search, at least one data layer from which the response can be generated, wherein the determined at least one data layer includes the highest level data layer from which the response can be generated; and generate, based on data of the determined at least one data layer, a response to the query.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
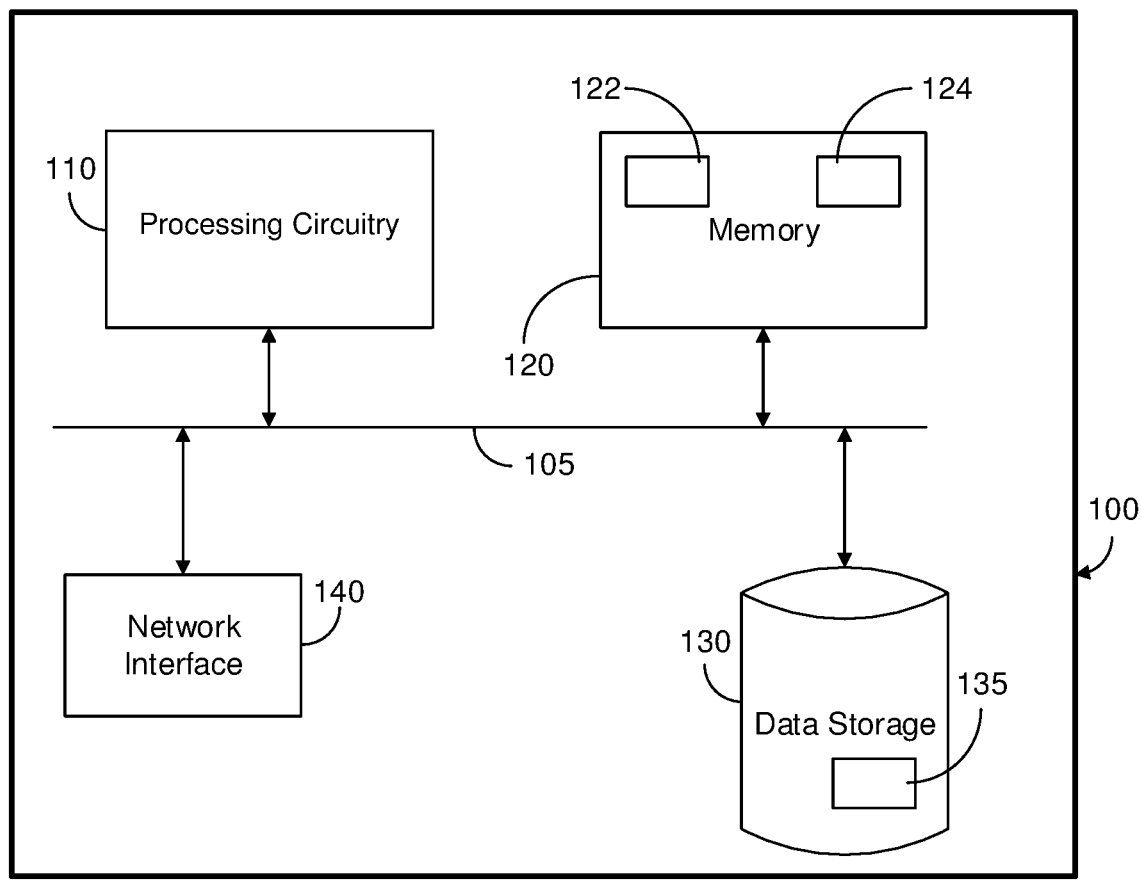
FIG. 1 is a schematic diagram of a business intelligence system implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for decreased response times to queries. At least one dataset is generated which may include, but is not limited to, a BI dataset. Each generated dataset is utilized as a data layer accessible to, e.g., a BI system. One or more databases may also be used as a data layer. A query is determined. Based on the query, a highest level data layer from which a response can be generated is determined. The highest level data layer is the data layer which can be accessed most rapidly among a plurality of data layers. Using the determined highest level data layer, a response is generated.

FIG. 1 shows an example schematic diagram of a business intelligence (BI) system 100 according to an embodiment. The BI system 100 includes a processing circuitry 110, a memory 120, a data storage 130, and a network interface 140. In an embodiment, the components of the BI system 100 are connected via a bus 105.

The processing circuitry 110 may be realized as one or more hardware logic components and circuits. For example, and without limitation, illustrative types of hardware logic components that can be used include field programmable gate arrays (FPGAs), application-specific integrated circuits (ASICs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. In one configuration, computer readable instructions to implement one or more embodiments disclosed herein may be stored in the storage 130.

In another embodiment, the memory 120 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 110 to at least efficiently generate responses to BI system queries, as discussed herein below.

In an embodiment, the BI system 100 is configured to analyze raw data from the data sources and to generate, based on the analysis, a lowest data layer and at least one additional dataset. In an embodiment, the lowest data layer is a common dataset that can be served by all of the data layers. In some embodiments, a first data layer is considered "above" a second data layer (i.e., of a higher level), if the first data layer has been further processed from the second data layer. For example, a layer of raw data is "under" (i.e., of a lower level) a layer of enriched data. Enriching data may include, in certain embodiments, homogenizing data fields (for example reformatting a number to comply with a phone number format), unifying data fields (for example combining fields for "First Name" and "Last Name" to "Name"), and the like. The at least one additional dataset may include, but is not limited to, a parsed dataset, a subset of data stored in the data sources, a BI dataset, and the like. As a non-limiting example, based on data in a plurality of databases, the BI system 100 may be configured to generate a subset dataset including particular columns or fields from the data in the plurality of databases. As a further example, the BI system 100 may be configured to generate a BI dataset based on the subset dataset. The BI dataset may include, but is not limited to, enriched data, reports, graphical user interfaces, combinations thereof, and the like. Each generated dataset may be utilized as a data layer.

The analysis of the raw data may include, but is not limited to, data mining, process mining, statistical analyses, predictive analyses, predictive modeling, process modeling, data lineage, complex event processing, and prescriptive analytics. The analytics may be stored as datasets including information such as, but not limited to, key performance indicators, key quality indicators, statistical analyses, and the like.

The BI system 100 may be configured to respond to queries for information using efficiently generated responses as described herein. Specifically, in an embodiment, the BI system 100 is configured to access at least one data layer, where the at least one data layer is organized from, as a non-limiting example, low to high. Each data layer may be or may include a dataset. Certain data layers may further include enriched data, performance indicators, visual representations of data (such as graphs, charts, etc.), and the like. In an example implementation, higher data layers may be accessed more efficiently. Data may be accessed more efficiently if, for example, the data is more organized, further enriched, more actionable, internally available (rather than available via an external storage), part of a smaller dataset, a combination thereof, and the like. The operation of the BI system 100 is discussed in greater detail herein below.

The storage 130 may be magnetic storage, optical storage, and the like, and may be realized, for example, as flash memory or other memory technology, CD-ROM, Digital Versatile Disks (DVDs), or any other medium which can be used to store the desired information.

The network interface 140 allows the BI system 100 to communicate with data sources, with sensory controllers (e.g., the sensory controller 220, FIG. 2), or both, for the purposes of, for example, obtaining raw data, receiving queries for analytics, causing sensory-based analytics to be provided to a user device, and the like.

It should be understood that the embodiments described herein are not limited to the specific architecture illustrated in FIG. 1, and that other architectures may be equally used without departing from the scope of the disclosed embodiments.

Figure 2:
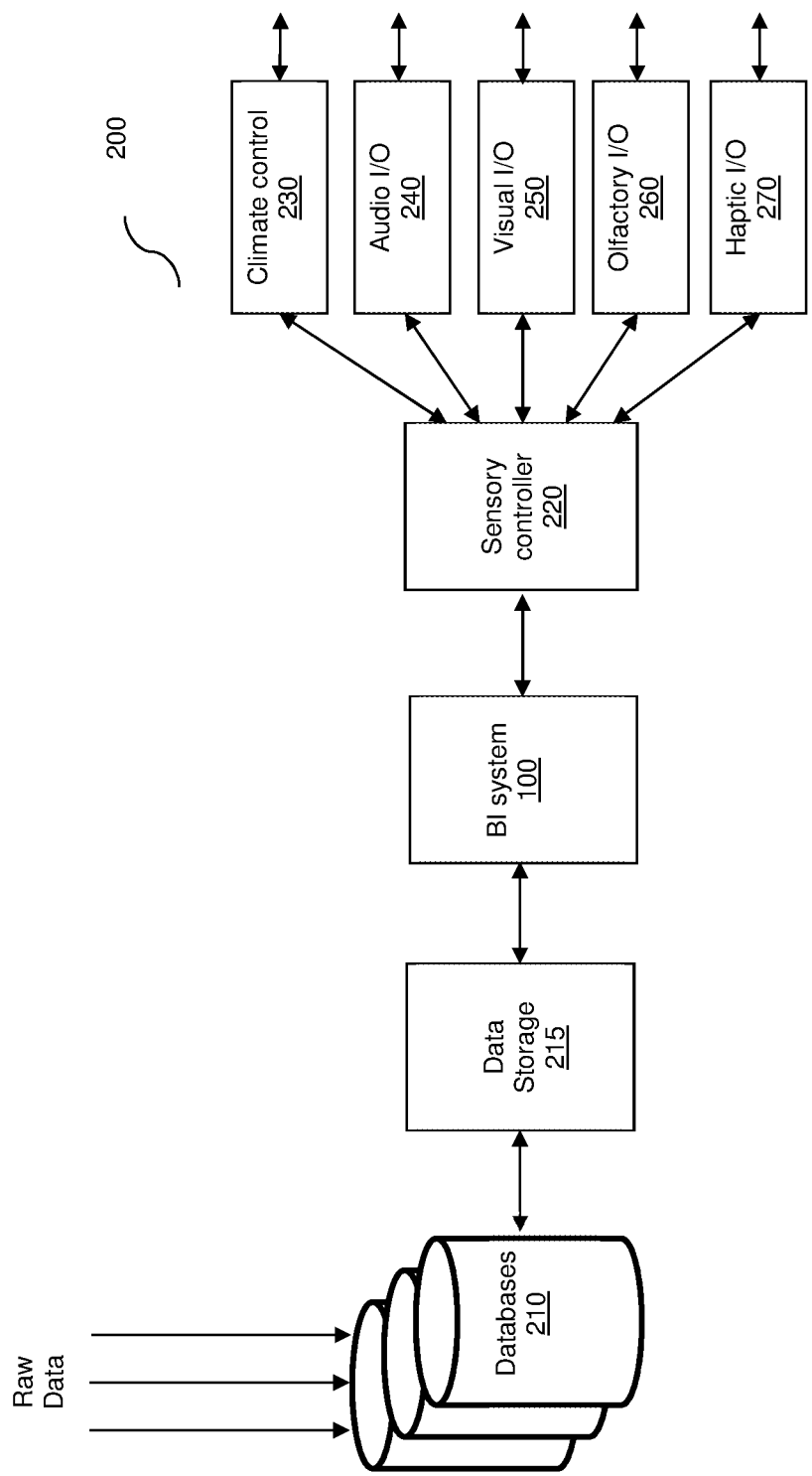
FIG. 2 is a schematic diagram illustrating communications between a business intelligence system and a sensory controller.

FIG. 2 is an example schematic diagram 200 including one or more databases 210, a data storage 215, the BI system 100, a sensory controller 220, a climate control interface 230, an audio input/output (I/O) interface 240, a visual I/O interface 250, an olfactory I/O interface 260, and a haptic interface I/O 270.

The databases 210 store raw data obtained from a plurality of data sources (not shown). The data sources may include, but are not limited to, web sources, operational systems, or other sources of data to be analyzed. Such data may include structured, unstructured, or semi-structured data, or a combination thereof. As a non-limiting example, the data sources may include data such as, but not limited to, metadata of an electronic document (e.g., filename, author, size), product data, account data, patient data, student data, planning data, combinations thereof, and the like. In an embodiment, the BI system 100 may be configured to generate analytics based on the data stored in the databases 210.

The data storage 215 may store analytics generated by the BI system 100. In particular, the BI system 100 may be configured to generate and store analytics and BI datasets in the data storage 215. The BI datasets may be used to, e.g., generate responses to queries, to supply information to a dashboard, both, and the like. For example, the BI system 100 may generate key performance indicators (KPIs), key quality indicators (KQIs), statistical analyses, reports, and the like.

In an embodiment, the BI system 100 is communicatively connected to the sensory controller 220. The sensory controller 220 is communicatively connected to one or more sensory control interfaces. In the example embodiment shown in FIG. 2, the sensory control interfaces communicatively connected to the sensory controller include the climate control interface 230, the audio input/output (I/O) interface 240, the visual I/O interface 250, the olfactory I/O interface 260, and the haptic I/O interface 270. Each of the example sensory control interfaces may include or be communicatively connected to one or more sensors. It should be noted that the example sensory control interfaces shown in FIG. 2 are not limiting, that more or fewer sensory control interfaces may be utilized, and that types of interfaces other than the example interfaces shown in FIG. 2 may be utilized, without departing from the scope of the disclosure.

The climate control interface 230 is configured to control one or more environmental control devices or systems such as, but not limited to, an air conditioning unit; a heating, ventilation, and air conditioning (HVAC) unit; a combination thereof; and the like. The climate control interface 230 further include or be communicatively connected to environmental sensors such as, but not limited to, a thermal sensor, a humidity sensor, and the like.

The audio I/O interface 240 may include, but is not limited to, a microphone, a speaker, or both. The audio I/O interface may be utilized to receive signals related to sounds in an area, to cause projection of sounds, or both. The audio I/O interface 240 or the sensory controller 220 may include a speech-to-text (S2T) adapter for converting, e.g., voice commands from a user into textual data. The S2T adapter may further include a natural language processing module. In an example implementation, the controller 220 may detect a plurality of users based on, e.g., different voice signatures received via the microphone. In some embodiments, the sensory controller 220 may be realized a processing circuitry, examples of which are provided above.

The visual I/O interface 250 may include sensors such as, but is not limited to, a camera, a depth-sensing camera (e.g., a time-of-flight camera), a light sensor, and the like. The visual I/O interface 250 may also include or be communicatively connected to a display, a projector, a programmable lightbulb (e.g., a smart LED lightbulb), a window shade control, a combination thereof, and the like. The visual I/O interface 250 may be utilized to receive signals related to, e.g., objects and organisms in an area, to project visual content, or both. In an example implementation, the visual I/O interface 250 may detect, via the sensors, a plurality of users.

The olfactory I/O interface 260 may include, but is not limited to, an olfactometer, an electronic nose, an odor releasing unit, a combination thereof, and the like. The olfactory I/O interface 260 may be utilized to receive signals related to scents in an area, to provide a fragrance, or both.

The haptic I/O interface 270 may include, but is not limited to, a tactile electronic display, a haptic feedback vibrator, an air vortex ring, an ultrasonic emitter, a force feedback unit, a pressure sensor, a combination thereof, and the like. The haptic I/O interface 270 may be utilized to receive signals related to force, vibration and the like, as well as to cause movement, vibration, or application of force.

The sensory controller 220 is configured to receive signals from the interfaces 230 through 270. The BI system 100 or the sensory controller 220 may be configured to assign a priority to each user detected via any of the interfaces 230 through 270 (e.g., when a plurality of users is detected by the audio I/O interface 240 or the visual I/O interface 250). The priorities may be assigned, e.g., randomly, based on strengths of received signals corresponding to particular users, and the like. In an embodiment, queries received by users may be handled according to an order determined based on the respective priorities of the users. The queries may be for, e.g., analytics, reports, and the like.

In another embodiment, the BI system 100 may be further configured to generate, based on the received signals, at least one query and a response to the at least one query. The response to the queries may include, but is not limited to, analytics, reports, graphical user interfaces, sensory outputs, combinations thereof, and the like.

In an embodiment, the response may include sensory outputs. The sensory outputs may include, but are not limited to, visual outputs, audio outputs, olfactory outputs, haptic outputs, climate changes, and the like. In a further embodiment, the sensory outputs may be determined based on the generated analytics. In a further embodiment, determining the sensory outputs may be further based on one or more predetermined thresholds. Some examples for generated responses are provided below.

As a non-limiting example, if a revenue analytic is above a predetermined threshold, the sensory outputs may be determined to include a visual output including a green display of the revenue analytic and an audio output including the statement: "Revenue is good: $500,000 this period." As another non-limiting example, if a profit analytic indicates that a company suffered a net loss, the sensory outputs may be determined to include a red display of the profit analytic and lowering of a room temperature.

In an embodiment, the predetermined thresholds utilized for determining the sensory outputs may depend on the user. For example, thresholds for a user of a first company may be different from thresholds from a user of a second, larger company.

It should be further noted that the types of sensors described herein are merely examples and do not limit the various disclosed embodiments. Other sensors such as, but not limited to, barometers, radiation sensors, proximity sensors, and the like, may be equally utilized without departing from the scope of the disclosed embodiments.

Figure 4:
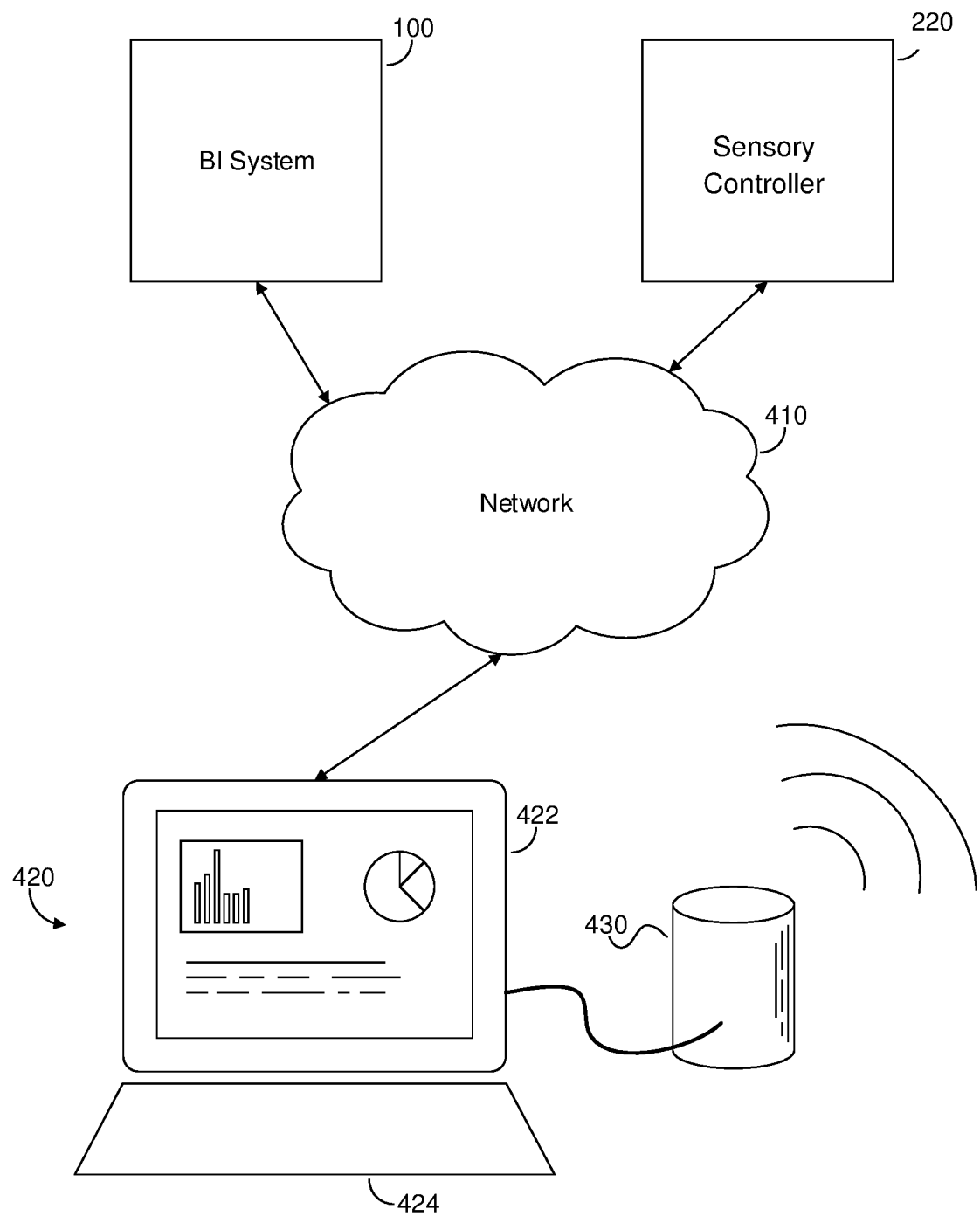
FIG. 4 is a network diagram utilized to describe the various disclosed embodiments.

It should be further noted that the components of the schematic diagram 200 are shown as being directly connected merely for simplicity purposes and may be distributed via a network without departing from the scope of the disclosed embodiments. In an example deployment, the sensory controller 220 may be communicatively connected to the BI system 100 via a network. In a further example, any of the interfaces 230 through 270 may be external to and geographically distant from the BI system 100. An example deployment of an I/O interface communicatively connected to the BI system 100 and to the sensory controller 220 over a network is seen in FIG. 4.

Figure 3A:
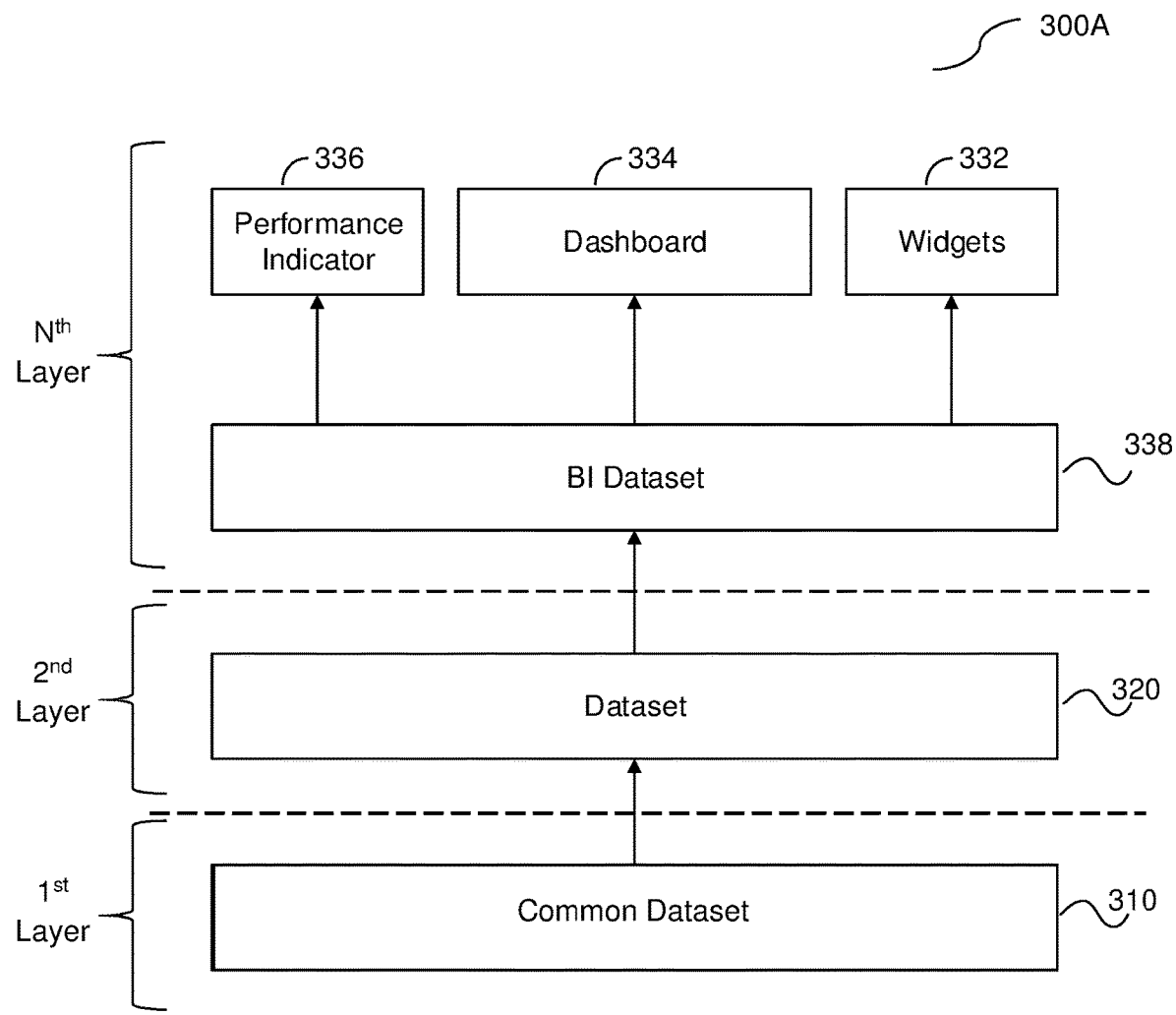
FIG. 3A is a schematic diagram illustrating data layers accessible to a business intelligence system.

FIG. 3A is an example schematic illustration 300 of data layers that may be accessible to a BI system (e.g., the BI system 100, FIG. 1). The example schematic illustration 300 includes at least one storage 310, a dataset 320, and a BI dataset 330. In an example implementation, the schematic illustration 300 also includes widgets 332, a dashboard 334, and a performance indicator 336. In the example schematic illustration 300, common data layer 310 includes data of one or more databases (e.g., the databases 210, FIG. 2). In an example implementation, the common data layer 310 is utilized as a first data layer, which is the lowest data layer and, as such, is only accessed to generate a response when the response cannot be generated based on data in higher data layers. The common data layer 310 may include, but is not limited to, raw data, partially processed data (e.g., parsed data), or both.

The dataset 320 may be, but is not limited to, a partially processed dataset generated based on data of the at least one database 310. As a non-limiting example, the dataset 320 may be a subset of the lowest level data layer 310. In an example implementation, the dataset 320 is utilized as a second level data layer, which is higher than the first data layer but lower than subsequently numbered data layers. The BI dataset 330 may include, but is not limited to, enriched data. The enriched data may be suitable for immediate or nearly immediate use without additional processing. In an example implementation, the BI dataset 330 is utilized as an $N^{th}$ (where N is an integer great than 1), which is the highest layer that is searched first when seeking data needed to generate a response. In the example shown in FIG. 3, the BI dataset is utilized as part of a third layer. The $N^{th}$ layer may further include one or more widgets 332, one or more dashboards 334, and one or more performance indicators 336.

In the example implementation shown in FIG. 3A, the data layers 310 through 330 are illustrated in order from lowest level (i.e., slowest or otherwise least efficient access) to highest level (i.e., fastest or otherwise most efficient access) based on a speed of access of, for example, a BI system (e.g., the BI system 100). That is, the BI system can access data from the third data layer 330 more rapidly than it can access data from the second data layer 320, and can access data from the second data layer 320 at least more rapidly than it can access data from the first data layer 310.

The speed of access may be based on, but not limited to, a size of the data layer (i.e., an amount of data in the data layer), structure (or lack thereof) of data of the data layer (i.e., data layers having structured data may be accessed more rapidly than unstructured data), communications resources needed to access the data layer (i.e., data layers internally may be accessed more rapidly than those in external systems and databases, and data layers subject to fewer authentication procedures and third party controls may be accessed more rapidly than data layers subject to more authentication procedures and third party controls), amount of processing needed to generate a response based on the data (i.e., enriched, organized, or otherwise preprocessed data may be utilized more rapidly than unprocessed or only partially processed data), combinations thereof, and the like.

Figure 3B:
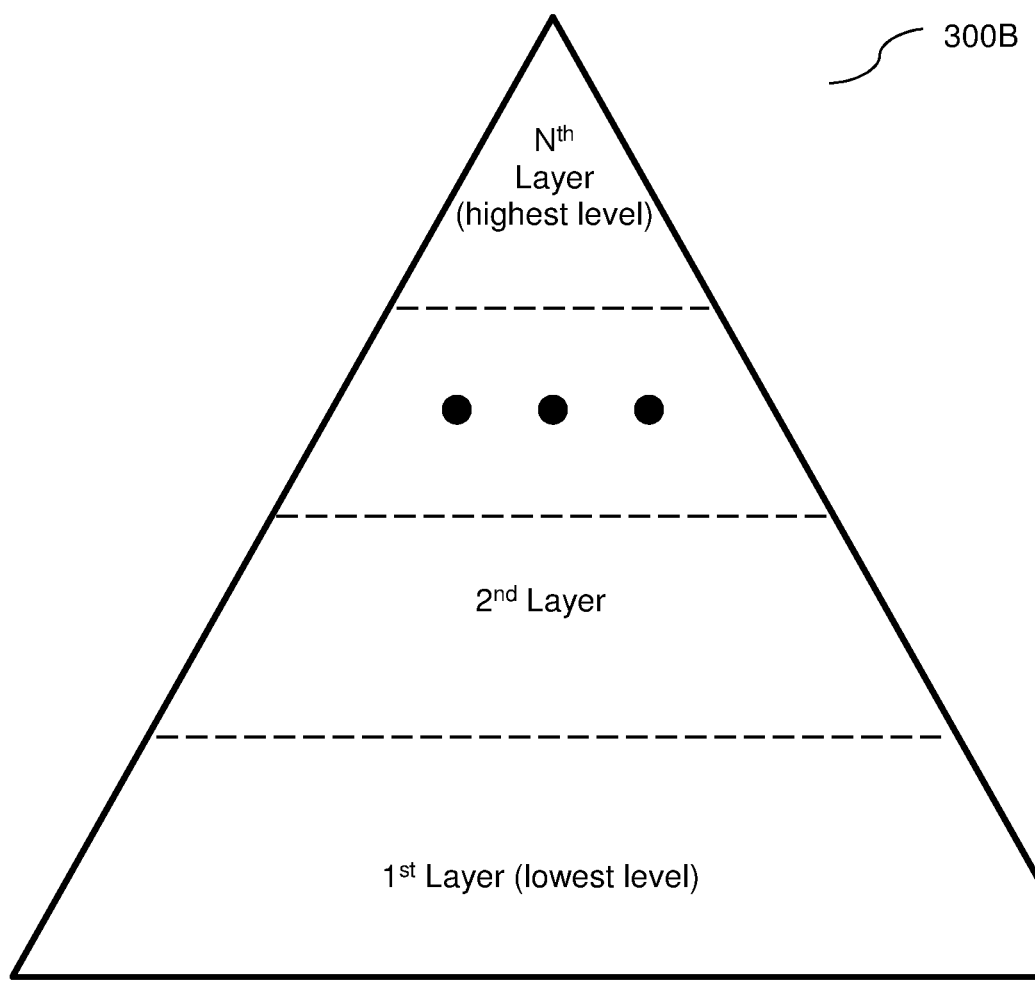
FIG. 3B is a data layer diagram illustrating relative levels of data layers that may be accessible to a business intelligence system.

FIG. 3B is an example data layer diagram 300B illustrating relative levels of data layers that may be accessible to a BI system (e.g., the BI system 100). The example data layer diagram 300B is illustrated as a pyramid. The example data layer diagram 300B includes a first (lowest level) data layer through an $N^{th}$ (highest level) data layer, where the $N^{th}$ data layer is at the top of the pyramid. The BI system searching for data needed to generate a response according to the embodiments disclosed therein will recursively search beginning with the $N^{th}$ data layer until at least one data layer including the data needed to generate the response is determined.

It should be noted that three data layers are shown with respect to FIGS. 3A and 3B merely for simplicity purposes and without limitation on the disclosed embodiments. More data layers, fewer layers, other data layers, and the like may be equally utilized without departing from the scope of the disclosed embodiments.

FIG. 4 is an example network diagram 400 illustrating a deployment of the BI system 100 and the sensory controller 220 according to an embodiment. In the example network diagram 400, the BI system 100 and the sensory controller 220 are communicatively connected to a user device 420 via a network 410. The network 410 may be, but is not limited to, a wireless, cellular or wired network, a local area network (LAN), a wide area network (WAN), a metro area network (MAN), the Internet, the worldwide web (WWW), similar networks, and any combination thereof. The user device 420 may be, but is not limited to, a personal computer, a laptop, a tablet computer, a smartphone, a wearable computing device, or any other device. The user device 420 may include, but is not limited to, a processing element, a memory, a storage device, inputs, outputs, and the like.

In the example network diagram 400, the user device 420 includes a display 422 and an input device 424. The input device 424 may be, but is not limited to, a keyboard, a mouse, both, and the like. Further, the user device 420 is connected to an audio I/O device 430. The audio I/O device 430 may include, but is not limited to, a processing circuitry, a microphone, and a speaker. The user device 420, the audio I/O device 430, or both, may be utilized to send a query to the BI system 100. The query may be a request for information such as, but is not limited to, data, analytics, a report, or a graphical user interface (GUI) generated or retrieved by the BI system 100. The graphical user interface may be, but is not limited to, a dashboard. In an embodiment, the BI system 100 is configured to send the requested data for display on the display 422.

In an example deployment, the audio I/O device 430 detects sound made by, e.g., a user of the user device 420 as audio signals received via the microphone. The audio signals may be processed by the audio I/O device 430, the sensory controller 220, and the like. The processing may include, but is not limited to, natural language processing for generating textual output based on the received audio signal. Alternatively or collectively, textual data may be received as inputs via the keyboard 424. In an embodiment, the sensory controller 220 is configured to parse the textual data to determine at least one query.

In another embodiment, the BI system 100 may be configured to receive one or more user inputs via, e.g., the keyboard 424, a mouse (not shown), a touch screen (not shown), or other I/O interfaces of the user device 420.

In an embodiment, the BI system 100 is configured to generate a response based on the at least one query. The response may include sensory outputs such as, but not limited to, environmental changes (e.g., raising or lowering temperature via an HVAC unit), a visual projection (e.g., of analytics, a report, a graphical user interface, etc.), an audio projection, olfactory feedback, haptic feedback, combinations thereof, and the like. In an embodiment, the BI system 100 is further configured to determine at least one sensory interface for providing the sensory outputs to the user of the user device 420. The determination of the at least one sensory interface may be based on, but not limited to, the at least one query, the response, one or more predetermined rules, a combination thereof, and the like.

In an embodiment, the BI system 100 is configured to generate a response to a query from received from the user device 420 or the sensory controller 220 using data of at least one data layer (e.g., at least one of the data layers 310, 320, and 330, FIG. 3). In a further embodiment, the BI system 100 is configured to determine whether a response can be generated using data in a highest level data layer accessible to the BI system 100. In yet a further embodiment, if the response cannot be generated using data in the highest level data layer, lower data layers may be recursively checked until a highest level data layer including data for which the response can be generated is found. In an example embodiment, higher level data layers may be accessed faster by the BI system 100 than lower data layers.

Figure 5:
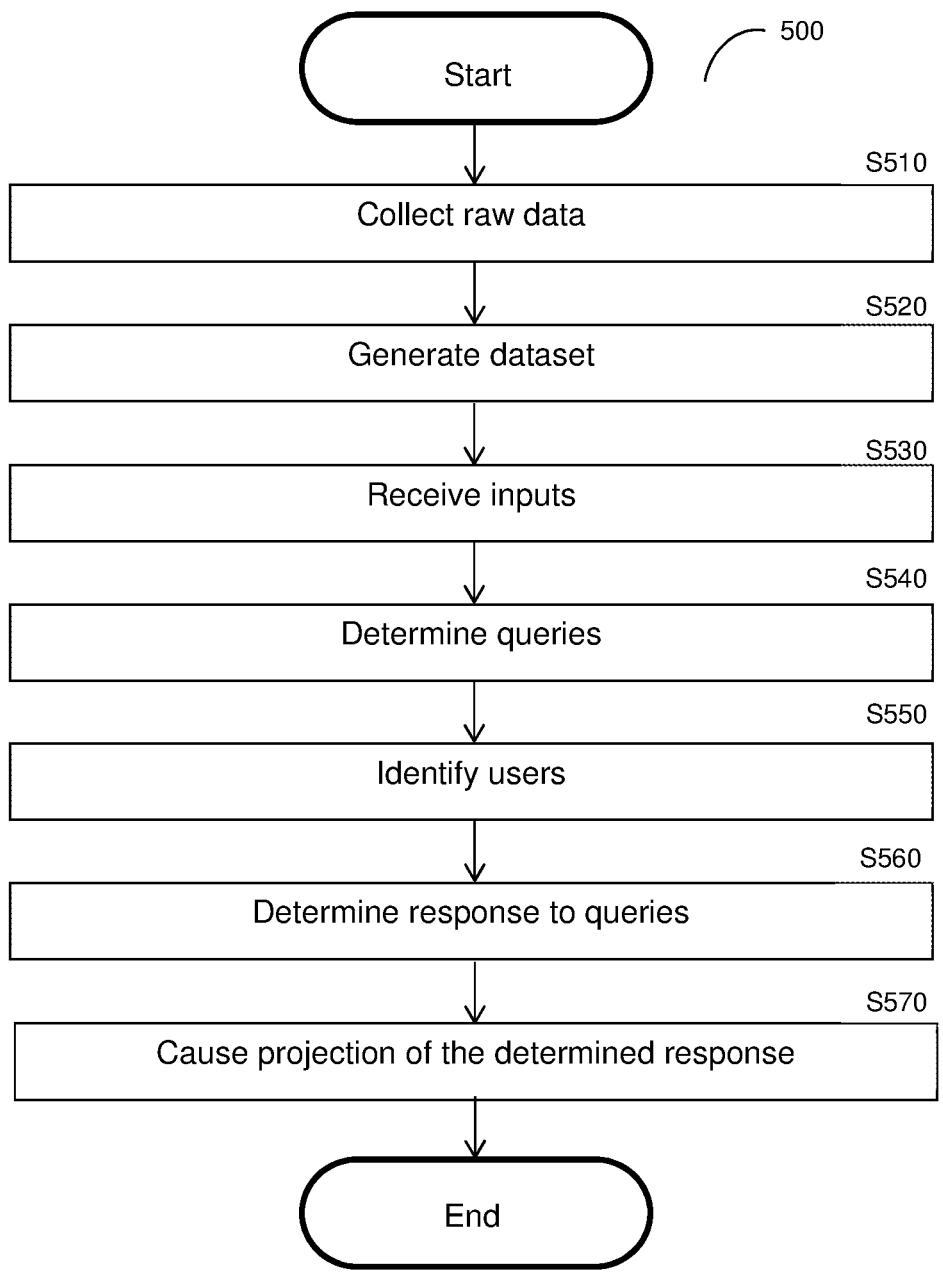
FIG. 5 is a flowchart illustrating a method for providing a sensory-based analytics response to a query according to an embodiment.

FIG. 5 is an example flowchart 500 illustrating a method for providing a sensory response to a query according to an embodiment. In an embodiment, the method may be performed by a BI system (e.g., the BI system 100, FIG. 1) sending data to a sensory controller (e.g., the sensory controller 220, FIG. 2). The BI system may be communicatively connected to one or more user devices, interfaces, or both, for receiving and sending inputs and outputs.

At S510, raw data to be analyzed is collected from a plurality of data sources. In an embodiment, S510 may include extracting the data from the plurality of data sources (e.g., the databases 210, FIG. 2). In a further embodiment, S510 may also include generating a lowest level data layer, where the lowest level data layer is a dataset including data from the plurality of data sources.

At S520, the collected raw data is analyzed to generate at least one dataset. The generated at least one dataset may include, but is not limited to, a subset of the collected raw data, a BI dataset, or a combination thereof. In an embodiment, generation of the BI dataset may include performing a regression analysis on at least a portion of the collected raw data. The regression analysis may be performed using regression techniques that are familiar to one having ordinary skill in the art. A regression analysis is a statistical process for estimating the relationships among variables.

The BI dataset may include, but is not limited to, graphical user interfaces (GUIs), reports, analytics (e.g., KPIs, KQIs, etc.), combinations thereof, and the like. The analytics may be further organized into one or more tables. In an embodiment, S520 may include performing a plurality of business intelligence operations on the collected raw data.

At S530, at least one input is received or captured from at least one user device (e.g., the user device 420, FIG. 4), from at least one sensory I/O interface, a combination thereof, and the like. The at least one input may include, but is not limited to, sensory inputs, textual inputs, interactions with I/O interfaces (e.g., mouse, touch screen, keyboard, etc.), and the like. The sensory I/O interface may be communicatively connected to one or more sensory input devices (e.g., a camera, a microphone, a light sensor, etc.) and one or more sensory output devices (e.g., a speaker, a display, a projector, a light fixture, etc.).

At S540, at least one query is determined based on the received at least one input. In a further embodiment, S540 may include parsing textual inputs. In another embodiment, S540 may include performing speech-to-text or machine imaging to generate text based on audio or visual inputs, respectively. Alternatively or collectively, one or more predetermined queries may be determined at, e.g., predetermined time intervals. Regularly determining predetermined queries may allow for, e.g., providing regular updates regarding certain analytics.

At optional S550, for each query, a user may be identified based on at least a portion of the received at least one input corresponding to the query. As a non-limiting example, if three audio signal signatures are received as inputs, three users may be identified. The at least one user may be identified based on, e.g., matching between at least a portion of the received input and a plurality of predetermined signals of known users. In a further embodiment, if a portion of the received at least one input does not match any of the predetermined signals above a predetermined threshold, the user may be identified as unknown.

At S560, a response to the at least one query is determined. In an embodiment, S560 may include querying a data storage (e.g., the data storage 215, FIG. 2) with respect to a BI dataset or at least one analytics dataset, querying at least one database (e.g., the databases 210, FIG. 2), a combination thereof, and the like. In a further embodiment, S540 includes recursively searching through datasets based on an order (e.g., from highest level to lowest level, where the highest level dataset is accessed most rapidly) to at least reduce time needed to access data utilized for generating the response, thereby efficiently generating a response. The recursive searching may also reduce usage of computing resources due to, e.g., searching through an external system, searching through multiple systems, retrieving data from external systems, searching through large amounts of irrelevant data, and the like. Recursively searching to efficiently generate responses is described further herein below with respect to FIG. 6.

In an embodiment, the response includes at least one sensory output for each query.

To this end, in a further embodiment, S560 may further include selecting at least one sensory output. The selection may be based on at least one sensory output selection rule. The sensory output selection rules may be utilized to select a sensory output based on, e.g., a particular user, an analytic, a query, a type of each of the at least one input, a combination thereof, and the like. As a non-limiting example, if a query is received via a voice command input, the sensory output may be an audio output.

In yet a further embodiment, the response may include at least one sensory output for each identified user. In a further embodiment, the response may be based on an order of the users. The order may be based on, e.g., a predetermined priority of the users. The priority may be represented as, e.g., a numerical value (e.g., a priority of 10 may be the highest priority and a priority of 1 may be the lowest priority). In another embodiment, duplicate sensory outputs may be removed from the response. For example, if sensory outputs in the response would include two instances of audio output of the words "Sales are good: $300,000.00 this quarter," one instance of the audio output may be removed. In a further embodiment, users that are identified as unknown may be assigned the lowest priority. If users are assigned the same priority, the order of the users may be determined, e.g., randomly, based on an order of receipt of the corresponding inputs, and the like.

In another embodiment, the selection rules may be determined based on machine learning processing for a particular user. The machine learning processing may be based on previous sensory inputs detected after causing projection of at least one sensory output. As a non-limiting example, if no visual or audio inputs are received after projection of audio including the word "bad," it may be determined that the projection of audio for the user was ineffective. Accordingly, selection rules for the user may exclude audio outputs.

In yet another embodiment, the selection rules for a particular user may be based on metadata associated with the user. The metadata may indicate, but is not limited to, impairments or other reasons as to why particular types of sensory output will be ineffective for a user. For example, if metadata for the user indicates that the user is visually impaired, the selection rules may exclude visual output or may otherwise restrict visual output to only select types of visual output. In another embodiment, S560 may include detecting, based on the received at least one input, an impairment of each user who is impaired. For example, a user device, or terminal, equipped with an imaging device may detect (or may provide the input for detecting) the eye movements of the user. Based on the detected eye movements, it may be determined whether the eye movements of the user are consistent with eye movements of a user having a visual impairment.

At S570, projection of the at least one sensory output of the response is caused.

Projecting the sensory outputs may include, but is not limited to, causing audio projection of an audio output, causing display of a visual output, causing illumination of a light-based output, causing haptic feedback, causing olfactory feedback, causing a change in environment, and the like. In an embodiment, S570 includes causing projection of each determined sensory output. In a further embodiment, S570 may include selecting an interface for projecting each output. As an example, the selected interface may be an interface from which an input of the same user was received.

Figure 6:
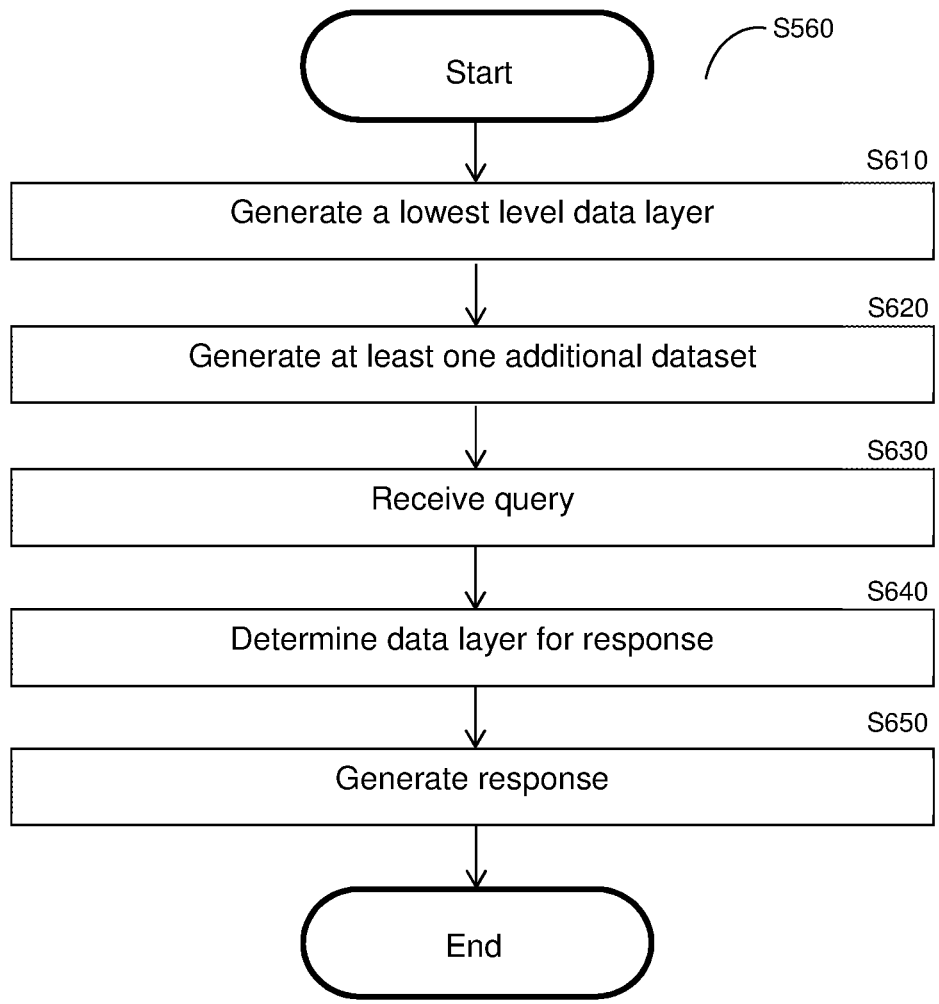
FIG. 6 is a flowchart illustrating a method for efficiently generating responses to business intelligence system queries according to an embodiment.

FIG. 6 is an example flowchart S560 illustrating a method for efficiently generating responses to queries. In an embodiment, the method may be utilized to reduce the response time to queries received by a BI system At S610, a lowest level data layer is generated from raw data stored from one or more databases. The lowest level data layer is the common dataset that can be served by all upper data layers. In some embodiments, the lowest data layer may be a dataset including the raw data. In certain embodiments, the lowest level data layer is extracted from the raw data, to create a common dataset from which enriched datasets, performance indicators, and the like, may be generated.

At S620, at least one additional dataset is generated. Such datasets may be organized in hierarchy of data layers as shown, for example, in FIG. 3A. In an embodiment, data in lower level data layers may be processed more rapidly than data in higher level data layers. In a further embodiment, a dataset of a lower level data layer includes more data than datasets in higher level data layers.

In an embodiment, S620 includes generating at least one BI dataset. To this end, in a further embodiment, S620 may include performing a plurality of BI operations on the dataset generated at S610.

At S630, a query is received. The query may be received from, for example, a user device (e.g., the user device 420, FIG. 4). Alternatively, a predetermined query may be utilized (e.g., one of the queries determined at S540, FIG. 5). In an embodiment, a plurality of queries may be received from a plurality of users. Each user may be assigned a priority such that, e.g., queries received from a first user may be responded to before queries by a second user. In another embodiment, the query may be received as, e.g., one or more sensory inputs. In a further embodiment, S630 further includes determining the query based on the one or more sensory inputs.

At S640, a highest level data layer or layers from which a response can be generated is determined. In an embodiment, S640 includes recursively searching through data layers based on an order (e.g., highest level to lowest level) until a data layer including the data needed to respond to the query is identified. A response may be generated from each data layer, for example by performing manipulations on the raw data. However, it is typically most efficient to determine a response from data which is already processed (or, for example, enriched) rather than perform the operations to enrich raw data to determine the response. In another embodiment, if a response can be completed based on data from at least two different data layers (e.g., a third and a second data layer), the at least two data layers may be determined. In a further embodiment, the determined data layer(s) include the highest data layers based on which the response can be generated. As a non-limiting example, the third data layer may be searched and, if the request cannot be completed using data only from the third data layer, the second data layer may be searched. If the request also cannot be completed using data only from the second data layer, the third data layer, or both, the first data layer may be searched.

At S650, using the determined data layer(s), a response to the query is generated. In an embodiment, S650 includes retrieving relevant data from the determined data layer. In another embodiment, a portion of the response may be generated using data from each of at least two determined data layers. As a non-limiting example, if at least a portion of the data needed for the response is in each of a third data layer and a second data layer, the response may be generated using data from both the second and third data layers.

It should be noted that various embodiments described herein are discussed with respect to levels of data layers, with higher level data layers being more efficient to access than lower level data layers, merely for simplicity purposes and without limitation on the disclosed embodiments. Specifically, the terms "level," "highest," and "lowest" are used to distinguish among data layers which can be accessed more or less efficiently than other data layers, and are not intended to limit the disclosed embodiments. Any organizational scheme for data layers in which each data layer can be accessed more or less efficiently (and, in an embodiment, rapidly) than other data layers may be equally utilized without departing from the scope of the disclosure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for efficiently responding to a query, comprising:
   generating a lowest level data layer, wherein the lowest level data layer is a common dataset that can be served by a plurality of higher level data layers;
   generating, based on the lowest level data layer, at least one dataset, wherein each generated dataset is one of the plurality of higher level data layers, wherein each higher level data layer is accessed more rapidly than all lower level data layers;
   searching, in at least one of the generated data layers, for data needed to generate a response to the query;
   determining, based on the search, at least one data layer from which the response can be generated, wherein the determined at least one data layer includes the highest level data layer from which the response can be generated; and
   generating, based on data of the determined at least one data layer, a response to the query.

2. The method of claim 1, wherein the at least one dataset includes a subset dataset and a business intelligence (BI) dataset, wherein the subset dataset is a subset of data of the lowest level data layer.

3. The method of claim 2, wherein generating the at least one dataset further comprises:
   performing, by a BI system, a plurality of BI operations on the subset dataset to generate the BI dataset.

4. The method of claim 3, wherein the subset dataset is a first higher level data layer, wherein the BI dataset is a second higher level data layer, wherein the second higher level data layer is accessed more rapidly than the first higher level data layer.

5. The method of claim 4, wherein the second higher level data layer further includes at least one of: a performance indicator, a dashboard, and a widget.

6. The method of claim 5, wherein the performance indicator is any of: a key performance indicator, and a key quality indicator.

7. The method of claim 1, wherein the at least one determined data layer includes a first determined data layer and a second determined data layer, wherein a first portion of the response is generated based on data of the first determined data layer, wherein a second portion of the response is generated based on data of the second determined data layer.

8. The method of claim 1, further comprising:
   determining, based on at least one sensory input, the query.

9. The method of claim 1, wherein the generated response includes at least one sensory output.

10. The method of claim 1, wherein each higher level data layer includes enriched data, wherein the lowest level data layer is extracted from raw data.

11. A non-transitory computer readable medium having stored thereon instructions for causing a processing circuitry to perform a process, the process comprising:
   generating a lowest level data layer, wherein the lowest level data layer is a common dataset that can be served by a plurality of higher level data layers;
   generating, based on the lowest level data layer, at least one dataset, wherein each generated dataset is one of the plurality of higher level data layers, wherein each higher level data layer is accessed more rapidly than all lower level data layers;
   searching, in at least one of the generated data layers, for data needed to generate a response to the query;
   determining, based on the search, at least one data layer from which the response can be generated, wherein the determined at least one data layer includes the highest level data layer from which the response can be generated; and
   generating, based on data of the determined at least one data layer, a response to the query.

12. A system for efficiently responding to a query, comprising:
   a processing circuitry; and
   a memory, the memory containing instructions that, when executed by the processing circuitry, configure the system to:
   generate a lowest level data layer, wherein the lowest level data layer is a common dataset that can be served by a plurality of higher level data layers;
   generate, based on the lowest level data layer, at least one dataset, wherein each generated dataset is one of the plurality of higher level data layers, wherein each higher level data layer is accessed more rapidly than all lower level data layers;
   search, in at least one of the generated data layers, for data needed to generate a response to the query;
   determine, based on the search, at least one data layer from which the response can be generated, wherein the determined at least one data layer includes the highest level data layer from which the response can be generated; and
   generate, based on data of the determined at least one data layer, a response to the query.

13. The system of claim 12, wherein the at least one dataset includes a subset dataset and a business intelligence (BI) dataset, wherein the subset dataset is a subset of data of the lowest level data layer.

14. The system of claim 13, wherein the system is further configured to:
perform, by a BI system, a plurality of BI operations on the subset dataset to generate the BI dataset.

15. The system of claim 14, wherein the subset dataset is a first higher level data layer, wherein the BI dataset is a second higher level data layer, wherein the second higher level data layer is accessed more rapidly than the first higher level data layer.

16. The system of claim 15, wherein the second higher level data layer further includes at least one of: a performance indicator, a dashboard, and a widget.

17. The system of claim 16, wherein the performance indicator is any of: a key performance indicator, and a key quality indicator.

18. The system of claim 12, wherein the at least one determined data layer includes a first determined data layer and a second determined data layer, wherein a first portion of the response is generated based on data of the first determined data layer, wherein a second portion of the response is generated based on data of the second determined data layer.

19. The system of claim 12, wherein the system is further configured to:
determine, based on at least one sensory input, the query.

20. The system of claim 12, wherein the generated response includes at least one sensory output.

* * * * *